US009092674B2

(12) United States Patent
Andrade et al.

(10) Patent No.: US 9,092,674 B2
(45) Date of Patent: Jul. 28, 2015

(54) METHOD FOR ENHANCED LOCATION BASED AND CONTEXT SENSITIVE AUGMENTED REALITY TRANSLATION

(75) Inventors: Rajiv Augusto Santos Galvao de Andrade, Sao Paulo (BR); Lucas Goncalves Franco, Sao Paula (BR); Christopher A. Robbins, Monroe Township, NJ (US)

(73) Assignee: International Business Machines Corportion, Armonk, NY (US)

( * ) Notice: Subject to any disclaimer, the term of this patent is extended or adjusted under 35 U.S.C. 154(b) by 1004 days.

(21) Appl. No.: 13/166,933

(22) Filed: Jun. 23, 2011

(65) Prior Publication Data
US 2012/0330646 A1    Dec. 27, 2012

(51) Int. Cl.
*G06K 9/72*    (2006.01)
*G06F 17/27*    (2006.01)
*G06K 9/00*    (2006.01)
*G06F 17/28*    (2006.01)
*G06K 9/32*    (2006.01)

(52) U.S. Cl.
CPC .......... *G06K 9/00671* (2013.01); *G06F 17/289* (2013.01); *G06K 9/3258* (2013.01)

(58) Field of Classification Search
None
See application file for complete search history.

(56) References Cited

U.S. PATENT DOCUMENTS

| | | | |
|---|---|---|---|
| 6,185,329 B1 | 2/2001 | Zhang et al. | |
| 6,473,523 B1 * | 10/2002 | Newman et al. | 382/176 |
| 6,904,160 B2 * | 6/2005 | Burgess | 382/113 |
| 7,031,553 B2 * | 4/2006 | Myers et al. | 382/289 |
| 7,171,046 B2 | 1/2007 | Myers et al. | |
| 8,031,943 B2 * | 10/2011 | Chen et al. | 382/182 |
| 8,320,708 B2 * | 11/2012 | Kurzweil et al. | 382/289 |
| 8,638,363 B2 * | 1/2014 | King et al. | 348/135 |
| 2001/0032070 A1 | 10/2001 | Teicher | |
| 2002/0037104 A1 * | 3/2002 | Myers et al. | 382/187 |
| 2004/0210444 A1 | 10/2004 | Arenburg et al. | |

(Continued)

FOREIGN PATENT DOCUMENTS

EP    1 359 557 A1    5/2003

OTHER PUBLICATIONS

Fragoso, Victor et al, TranslatAR: A Mobile Augmented Reality Translator on the Nokia N900, Jan. 5, 2011.

(Continued)

*Primary Examiner* — Brian Albertalli
(74) *Attorney, Agent, or Firm* — George R. McGuire; John Pivnichny; Bond Schoeneck & King, PLLC

(57) ABSTRACT

A computer system and method where text is recognized from a real world image, and this recognized text is used as input data for a processing program selected by a user. A computer system and method where text is recognized from a real world image, and contextual information is used in conjunction with the text to develop a semantic denotation of the recognized text. The contextual information may include GPS location data. The contextual information may include previous images, captured shortly prior to the image with the recognized text. A computer system and method wherein text is recognized from a real world image, then normalized to be in the plane of the image, then translated and then the translated text is made into an image that is anti-normalized and inserted into the original image (or an image similar to the original image). In this way, the translated text will appear realistically in place of the original untranslated text of the real world image.

12 Claims, 9 Drawing Sheets

(56) References Cited

U.S. PATENT DOCUMENTS

| | | | |
|---|---|---|---|
| 2004/0240735 A1* | 12/2004 | Medina | 382/173 |
| 2005/0192714 A1* | 9/2005 | Fong et al. | 701/1 |
| 2006/0038833 A1 | 2/2006 | Mallinson et al. | |
| 2006/0083431 A1* | 4/2006 | Bliss | 382/229 |
| 2008/0039120 A1* | 2/2008 | Gad | 455/456.2 |
| 2008/0233980 A1 | 9/2008 | Englund et al. | |
| 2008/0317346 A1* | 12/2008 | Taub | 382/182 |
| 2009/0048820 A1 | 2/2009 | Buccella | |
| 2009/0112572 A1* | 4/2009 | Thorn | 704/3 |
| 2009/0198486 A1 | 8/2009 | Chang | |
| 2009/0285445 A1 | 11/2009 | Vasa | |
| 2010/0250126 A1* | 9/2010 | Epshtein et al. | 701/209 |
| 2010/0331043 A1* | 12/2010 | Chapman et al. | 455/556.1 |
| 2011/0293183 A1* | 12/2011 | Tan | 382/182 |
| 2013/0188008 A1* | 7/2013 | Meadow et al. | 348/36 |

OTHER PUBLICATIONS

Zhang, Yi et al, Text Extraction From Images Captured Via Mobile and Digital Devices, Department of Electrical and Computer Engineering, National University of Singapore, Int. J. Computational Vision and Robitics, vol. 1, No. 1, 2009, pp. 34-58, Inderscience Enterprises Ltd.

Park, Jonghyun et al, Binarization of Text Region Based on Fuzzy Clustering and Histogram Distribution in Signboards, World Academy of Science, Engineering and Technology, Issue 43, Jul. 2008, pp. 85-90.

Jhondavis, Translate Text From Photos Using Abbyy Fototranslate Mobile OCR Software, http://www.zimbio.com/Nokia/articles/pcLbu5Tu-2a/Translate+text+photos+using+ABBYY+FotoTranslate, May 29, 2010.

Yang, Jie et al, Automatic Detection and Translation of Text From Natural Scenes, Interactive Systems Laboratory, Carnegie-Mellon University, Pittsburg, PA, issue date May 13-17, 2002.

Myers, Gregory K. et al, Recognition of Text in 3-D Scenes, 2001, http://sri.com/esd/projects/vace/docs/SDIUTMyers2.pdf, Fourth Symposium on Document Image Understanding Technology, SRI International, Menlo Park, CA.

Sage, Simon, Nokia Working on Augmented Reality Language Translations Via OCR Character Recognition, www.intomobile.com/2009/10/09/nokia-working-on-augmented-reality-language-translation-via-ocr-character-recognition/, as of Nov. 17, 2010.

Liang, Jian, Geometric Rectification of Camera-Captured Document Images, IEEE Transaction on Pattern Analysis and Machine Intelligence, vol. X, No. X, YY, pp. 1-32, Jul. 6, 2006.

Augmented Reality, http://www.replay.waybackmachine.org/20100125114426/http://en.wikipedia.org/wiki/Augmented_reality, as of Jan. 25, 2010.

* cited by examiner

WHAT APP WOULD YOU LIKE TO RUN?

1. POST CURRENT LOCATION TO MY WEBSITE

2. ADD A BUSINESS TO MY CONTACT LIST

A. ABC FLORIST
       1234 MAIN STREET, CITYVILLE

B. DEF PROFESSIONAL ACCOUNTANTS
       456 FIRST AVENUE, CITYVILLE

C. GHI GROCERY STORE
       123 MAIN STREET, CITYVILLE

3. FIND NEARBY RESTAURANTS

4. FIND ENCYCLOPEDIA ENTRY FOR:

A. CITYVILLE USA

B. BATTLE OF CITYVILLE

C. MAYOR OF CITYVILLE

5. GET DIRECTIONS TO:

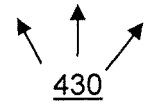
430

METHOD FOR ENHANCED LOCATION BASED AND CONTEXT SENSITIVE AUGMENTED REALITY TRANSLATION

BACKGROUND

1. Field of the Invention

The present invention relates to systems and methods for presenting augmented reality also to systems and methods for processing image data where to image data includes computer recognizable characters.

2. Description of the Related Art

Augmented reality systems are known. Augmented reality ("AR") refers herein to a system that presents a live presentation (that includes at least a visual presentation) of a physical, real-world environment which presentation is augmented by computer-generated sensory input, such as text data, sound or graphics. The AR presentation may be direct, like, for example, a user looks through a transparent screen with computer-generated graphic data superimposed on the screen. The AR presentation may be indirect, like, for example, when a visual presentation of a sporting event through a broadcast television has computer-generated score related data superimposed on the television display viewed by viewers geographically remote from the sporting event. AR presentations are not necessarily viewed by users at the same time the visual images are captured. AR presentations are not necessarily viewed in real time. As a simple example of this, the AR visual presentation may be in the form of a snapshot showing a single instant of time, but this snapshot may be reviewed for a relatively long period of time by a user. AR technology enhances one's perception of reality. AR technology is different than virtual reality ("VR") because VR technology replaces the real world with a simulated one. AR augmentation data is conventionally in semantic context with environmental elements, such as sports scores on TV during a match. Advanced AR technology includes additions such as computer vision and object recognition. Through AR technology, the surrounding real world of the user may be made more interactive and/or meaningful.

There is a known AR system called TranslatAR that can detect text in a real world image (such as a video frame) and translate the text from its native language (if known) and into some other language selected by the user. The translation is then superimposed over the real world image of the characters on the real world image of the text in the image (for example, the image of a sign) as augmented data to form the AR visual presentation. In this way, if a user knows that the signs in her area are in Chinese, but the user wants English language translations, then the user can set the TranslatAR system to translate the local signs from Chinese to English, for example.

BRIEF SUMMARY

A computer system and method where text is recognized from a real world image, and this recognized text is used as input data for a processing program selected by a user. A computer system and method where text is recognized from a real world image, and contextual information is used in conjunction with the text to develop a semantic denotation of the recognized text. The contextual information may include GPS location data. The contextual information may include previous images, captured shortly prior to the image with the recognized text. A computer system and method wherein text is recognized from a real world image, then normalized to be in the plane of the image, then translated and then the translated text is made into an image that is anti-normalized and inserted into the original image (or an image similar to the original image). In this way, the translated text will appear realistically in place of the original untranslated text of the real world image. One of potential advantage of at least some embodiments of the present invention is that some embodiments of the present invention can provide an efficient real time method and system for AR translation (and other features). Prior art, such as the TranslatAR system, may provide static methods for translating text from captured images, but some embodiments of the present invention: (i) work in a real time manner; and/or (ii) can be implemented on mobile devices.

According to one aspect of the present invention, a method is performed by a computer system and includes the following steps: receiving an image; performing character recognition on at least a portion of the image to yield a recognized character string as text data; choosing a first further data processing program which is stored on a software storage device; inputting at least a portion of the recognized character string to the first further data processing program; processing input data, by the first further data processing program, with the input data including at least a portion of the recognized character string; and receiving output data resulting from the data processing step.

According to a further aspect of the present invention, a computer system includes a first data processing program module; an image receiving module; a character recognition module; a further data processing program chooser module; and an input module. The image receiving module is structured and/or programmed to receive an image. The character recognition module is structured and/or programmed to perform character recognition on at least a portion of the image to yield a recognized character string as text data. The further data processing program chooser module is structured and/or programmed to choose the first further data processing program to be used for further processing. The input module is structured and/or programmed to input at least a portion of the recognized character string to the further first data processing program. The first further data processing program module is structured and/or programmed to perform data processing on input data with the input data including at least a portion of the recognized character string to output data processing output data resulting from the data processing.

A method is performed by a computer system and includes the following steps: receiving, by a computer system, an image and associated contextual information data; performing character recognition, by the computer system, on at least a portion of the image to yield a recognized character string as text data; determining symbolic denotation data, by the computer system, indicating symbolic denotation of at least a portion of the recognized character string based upon the text data of the character string and the contextual information data; and performing further processing, by the computer system, on the recognized character string based, at least in part, upon the symbolic denotation data.

According to a further aspect of the present invention, a computer system includes a receiving module; a character recognition module; and a symbolic denotation module. The receiving module is structured and/or programmed to receive an image and associated contextual information data. The character recognition module is structured and/or programmed to perform character recognition on at least a portion of the image to yield a recognized character string as text data. The symbolic denotation module is structured and/or programmed to: (i) determine symbolic denotation data indicating symbolic denotation of at least a portion of the recognized character string based upon the text data of the character string and the contextual information data, and (ii) perform further processing on the recognized character string based, at least in part, upon the symbolic denotation data.

According to a further aspect of the present invention, a method includes the steps of: isolating, by a computer system, a textual image portion of a raw image which includes a character cluster; normalizing, by the computer system, the textual image portion to generate a normalized textual image portion with a plane of the character cluster in the normalized textual image portion being at least substantially parallel with the projection plane of the raw image; performing character recognition, by the computer system, on the normalized textual image portion to yield a recognized character string; translating, by the computer system, the text into a different language to yield a translated character string; anti-normalizing, by the computer system, an image of the translated character string to generate a translated textual image portion; and inserting, by the computer system, the translated textual portion into a target image to form a translated AR image.

BRIEF DESCRIPTION OF SEVERAL VIEWS OF THE DRAWINGS

The present invention will be more fully understood and appreciated by reading the following Detailed Description in conjunction with the accompanying drawings, in which:

FIG. 8 is another screen shot showing a display generated by software according to the present invention.

DETAILED DESCRIPTION

Figure 1:
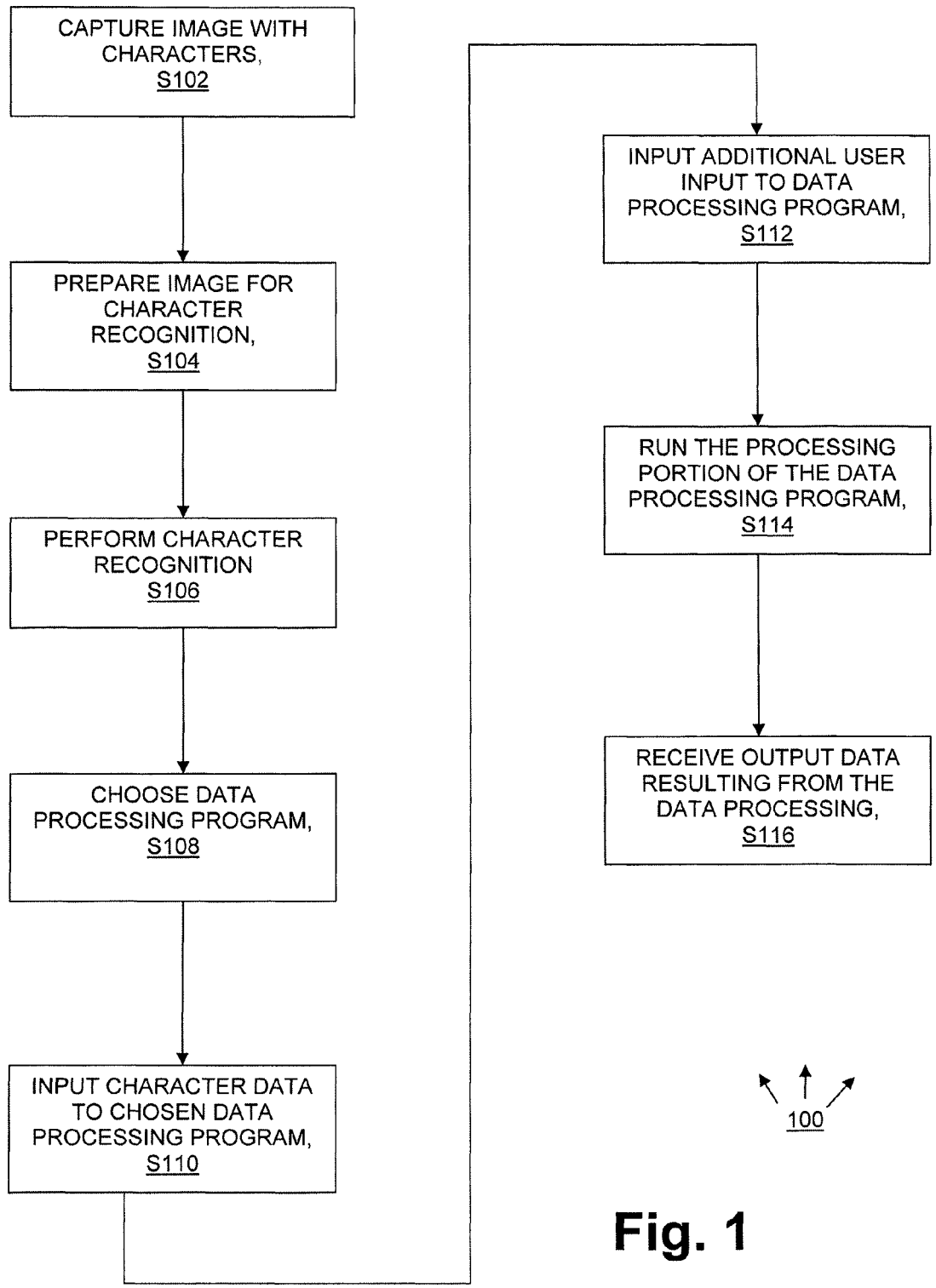
FIG. 1 is a flowchart showing a first embodiment of an image processing method according to the present invention.

FIG. 1 shows a method 100 according to the present invention that allows a user to run a data processing application using as input to the data processing program characters extracted from a captured image (for examples, snap shot image, video image). In other words, this method does more with characters recognized in an image than merely converting them into text data and/or translating the language of the recognized text. Rather, method 100 includes the further step of using the text data as an input to a data processing program so that further processing can be done beyond merely displaying the characters and/or their translation. In this way, the user interacts with image-derived text data, derived from real world image data, in other meaningful ways besides simply reading the text in an AR presentation of the image-derived text data.

As shown in FIG. 1, method 100 includes steps that will now be discussed. At step S102, a real world image (herein called "raw image data") is captured. This "image" may be a single image, or it may be a set of images from different discrete moments in time. The image may be a still image or an image derived from a larger set of video data.

At step S104, the raw image data is processed to prepare for character recognition. This preparation processing will be further explained below with reference to FIGS. 3 and 4.

At step S106, the character recognition is performed on the prepared image data to yield image-derived text data. This image-derived text data is machine readable as character data, as opposed to being data in the form of image data. For example, the image-derived text data may be in the form of ASCII text data. This image-derived text data may also be used to generate an AR visual presentation by being overlaid on an AR real world image including the text to form an image that includes both a real world image and a display of the image-derived text as AR augmentation data. Programs like the TranslatAR prior art may be used to automatically translate the text between languages at step S106 if making an AR visual presentation.

At step S108, the text data is used to allow a user to choose a processing program for performing further processing on the text data. This step will be further discussed below in connection with FIGS. 5 and 8, but for present purposes it should be understood that a user is allowed to determine what processing program, or programs, are used to further process the text data based on the image-derived text data that has been derived from the image. This is different than the TranslatAR prior art because that automatically translates any and all text that is recognized from the image data, so the user makes no choice based on the text data after it is read. One reason that it can be advantageous to allow the user to choose a processing program after the image-derived text has been derived is that the nature of the further processing that the user will want to have performed on the text will often vary with what the text is. As a simple example, if the text is a speed limit sign, then the user may want the text used to set the user's vehicle's cruise control (that is, automatic speed control) to correspond to the speed limit. However, if the text corresponds to a street address then the user would not want the street number used to set the cruise control of the vehicle based on the address number. Rather, the user would want different types of processing done on the image-derived text data, such as, for example, running an application that reveals the identity of the businesses are located at the street address of the image-derived text data. In this way, the user can have a richer and more interactive experience with the image-derived text data than is the data processing that is done on this data is limited to types of data processing that are chosen before the image-derived text data is captured and recognized.

At step S110, the image-derived text data is input to the chosen data processing program, or programs. At step S112 any additional user input is added. For example, assume that at step S108 the user chooses a business-finder application that can help find a particular type of business that is closest to an address which is input. The image-derived text will form a part of the user input to the program because this is the data that will determine for the business-finder data processing program what the proximity point of interest is. However, the business-finder data processing program still needs to have determined what type of business it is that the user is seeking.

In this case, the user may enter "HOSPITAL" (for example, by speaking the word "hospital" in response to an audio query) as additional user input data. Once both the proximity point and the nature of the sought-after business is known, the business-finder program will have all the user input that it requires to do the data processing necessary to help the user find the desired business.

At step S112, the chosen data processing program, or programs, are run based on the image-derived text, and also upon any additional user input. Sometimes the result of the data processing program will take the form of additional information that is communicated to the user and/or other people or machines. For example, in the business-finder data processing program of the preceding paragraphs, the result of the data processing is that the identity and location of the nearest hospital will now be determined and will then be communicated to the user at step S116. This communication of data to users can take many forms such as visual, audio, email, text messages and so on. Alternatively, or additionally, the output of the data processing program may take the form of control of some set of hardware based upon the result of the data processing. An example of this would be the above example where the chosen data processing program sets the cruise control setting of a powered vehicle to conform to the local speed limit. In this example, the status actual hardware, beyond a visual display or audio presentation, is set or adjusted based on the results of the running of the data processing program of this method.

Figure 2:
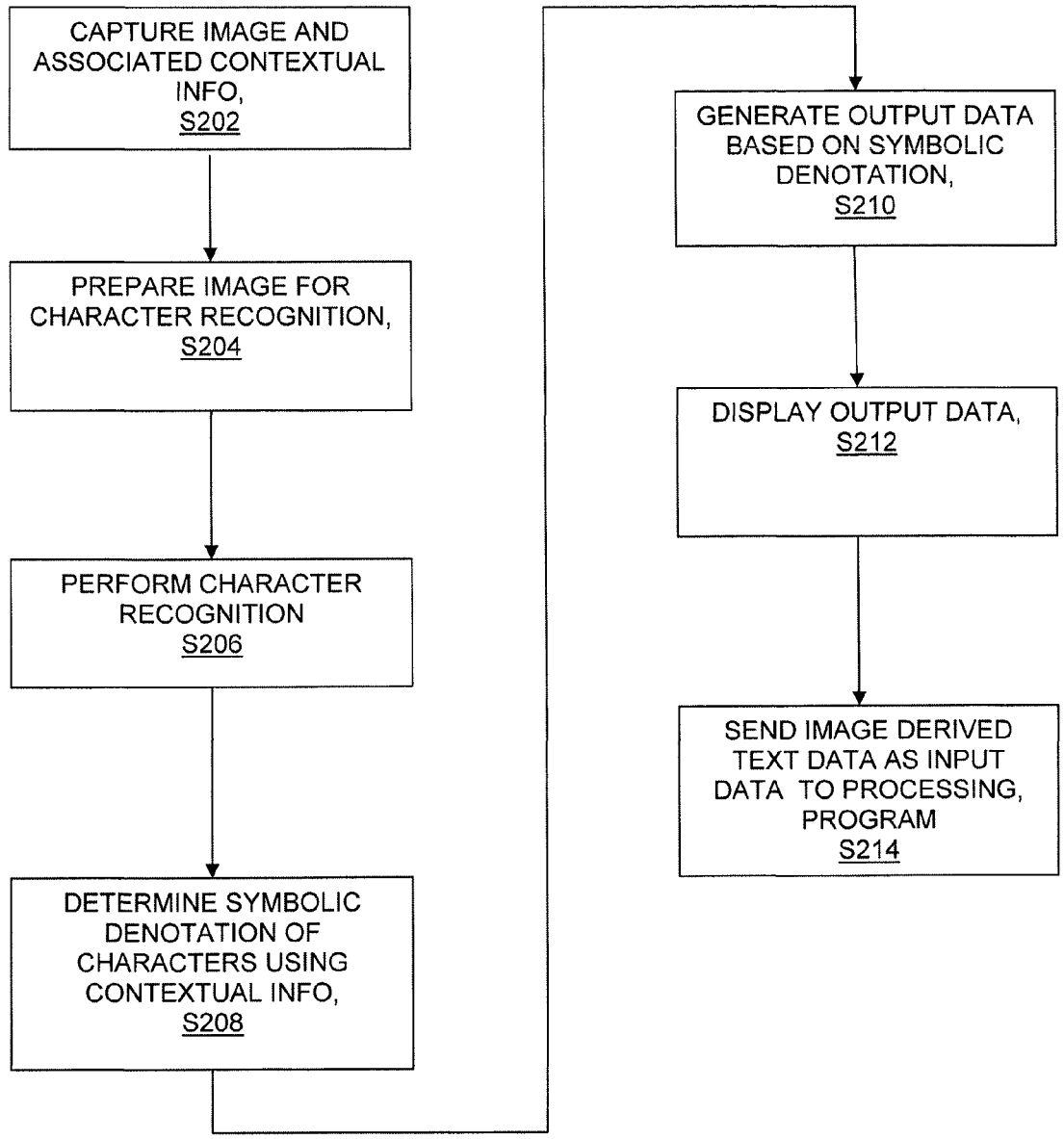
FIG. 2 is a flowchart showing a second embodiment of an image processing method according to the present invention.

FIG. 2 shows method 200 according to the present invention. At step S202, raw image data is again captured, similar to step S102 of method 100. Also at step S202, any additional contextual information is captured. In some embodiments of method 200 there will be no additional contextual information, but in embodiments where additional contextual information is to be used (as explained below), then it must be collected. At step S204, the raw image data is again prepared to yield prepared image data, similar to step S104 of method 100. At step S206, the prepared image data is again used to extract image-derived text data, similar to step S106 of method 100.

At step S208, the symbolic denotation of the characters is determined using contextual information. Sometimes the contextual information (in whole or in part) will be inherent in the image-derived text data itself. In other cases, the contextual information (in whole or in part) will be inherent in the portion of the raw image data which is in proximity to the portion of the raw image data from which the text was derived. In other cases, the contextual information (in whole or in part) will be derived from portions of the image of the raw image data that are remote from the portion of image of the raw image data from which the image-derived text was derived. In other cases, the contextual information will be completely separate from the image of the raw image data. These various possibilities will now be further explained through a series of examples:

Example (1)

Assume that the image-derived text data includes a portion that is in the form of a text string made up of a left parenthesis, followed by a three digit number, followed by a right parenthesis, followed by a three digit number, followed by a dash character followed by a four digit number. The contextual information inherent in this pattern of text data is that this string represents a telephone number in standard United States human-readable telephone number format. Other contextual information may be included in the telephone number string itself. For example, the three digits between the parenthesis are the area code which may reveal contextual information in the form of a geographic zone corresponding to that area code. Software according to the present information for identifying context may recognize both of these pieces of contextual information and use them to determine symbolic denotation as follows: (i) that part of the string represents a telephone number; and (ii) the user is located in a geographical area corresponding to the area code.

Example (2)

Assume that the image-derived text data was extracted from a bright green sign in the raw image data that has the text in a bright, high contrast white color. Further assume that the bright green sign is cropped closely around the text in the raw image. The contextual information inherent in this portion of the raw image is that the text being recognized is a residential area street sign. Or, alternatively, assume that the green sign is not closely cropped around the text, but, rather, that there is a lot of empty "green space." This would indicate a highway sign and determine symbolic denotation of the text as being the names of freeway exits roads. In either case, this contextual information is useful to know and to have determined automatically (as opposed to determined by the user taking the time to provide user input to the same effect).

Example (3)

Assume that the image includes the sun, or is at least taken generally facing direction of the sun based upon the way that objects are lit in the raw image. The contextual information may now include which way the user is facing or travelling. This kind of contextual information may be used, for example, to help give directions based in part on the image-derived text data. In this example, the contextual directional information comes from different parts of the raw image than the part from which the text has been derived.

Example (4)

Assume that GPS location information is determined at the time the raw image is captured. This GPS information is contextual information that can help adduce various aspects of symbolic denotation in many helpful ways. As one example, the local native language of the location of the raw image may be determined by consulting a database that has data on local languages corresponding to various GPS location areas throughout the world. This symbolic denotation, determined based on contextual information, of the identity of the local native language can be very helpful in determining further aspects of the symbolic denotation of the image-derived text data.

At step S208, the contextual information is used in conjunction with image-derived text data to determine a symbolic denotation of the text data. One example would be the determination that the image-derived text information refers to a specific email address—the symbolic denotation is the email address itself, which has been recognized as such. Another example would be the determination that the image-derived text information includes a specific telephone number—the symbolic denotation being the telephone number itself, which has been recognized as such. Another example would be the determination that the image-derived text includes a physical address—the symbolic denotation would be the physical address, which has been recognized as a physical address of a place (and not merely recognized as a string of alphanumeric characters).

Sometimes the determination of a symbolic denotation, based upon image-derived text and contextual information, is more complex. For example, assume that a user points the camera at a series of street signs as the user walks through an unfamiliar city without the benefit of a GPS device. Assume that there is sufficient contextual info in the image such that the street signs are recognized as signs labeling physical-world streets. At a simple level, the symbolic denotations of each street sign are: (i) that the traveler is travelling in some proximity to a street; and (ii) the name of the street over which the user is travelling. However, in some embodiments of the present invention, the contextual information (that is, the information facilitating the recognition of street signs as street signs) and the image-derived text based information (the characters making up the street names) may be further processed to determine which city the user is walking through based on the time and space proximity of a set of images of street signs of which the traveler has captured images. This determination of further symbolic denotation includes multiple raw images, multiple determinations of image-derived text and multiple determinations of context information. This embodiment (discussed further in connection with FIG. 9) may be especially useful in the case of GPS failure, which happens a lot in big cities.

Returning to method 200 shown in FIG. 2, at steps S210 and S212, output data is generated and displayed. For example, an AR visual presentation may be generated having: (i) as real world image data a billboard for XYZ Charity having its telephone contact information; and (ii) as overlaid augmented AR information in the AR visual presentation, a message that reads as follows: "Would you like to call XYZ Charity?" If the user says, or otherwise indicates, that he would like to make the call, then at step S214, her smart phone device will send the image-derived text data corresponding to the telephone number on the billboard to a telephone call placing program so that the user can connect to XYZ Charity by telephone call connection. It is noted that at steps S212 and S214, the symbolic denotation is used to help choose a further data processing application to run and then to run the chosen data processing application. It is the fact that the image-derived text was recognized as a telephone number and the name of an entity having that telephone number that caused the output to the user to ask whether the user wanted to make a telephone call, and, even more specifically, a telephone call to XYZ Charity. Then, if the user says yes, the telephone call dial application at step S214 needs to receive, as input, the telephone number. Of course, the dialer is not given "XYZ CHARITY" as the number (even though that was part of the image-derived text of the image captured by the user. Rather, the appropriate ten digits of the telephone number, which has been recognized to be a telephone number, is sent as input to the dialer. This is representative of the kinds of ways the present invention can go beyond merely recognizing text, as text, and presenting it to a user, and actually use the meaning of the text (traditionally only understood by humans) to facilitate the correct kinds of further data processing on the text. It is not that human beings and human understanding is cut entirely out of the process, but at least some of the burden of "thinking" about what the text means is shifted to the computer system so that the user needs devote less attention (or perhaps even no attention).

In connection with FIGS. 3 and 4, it will now be discussed how image-derived text can be determined and replaced back into an image that is the same or similar to the image from which the image-derived text was derived. To show the image processing involved in this FIGS. 3 and 4 include the following images: (i) raw image 302 (three dimensional projected onto a two dimensional plane); (ii) character cluster recognized image 304 (again, three dimensional projected onto a two dimensional plane); (iii) character cluster isolated image 306 (again, three dimensional projected onto a two dimensional plane); (iv) character recognition image 310 (two dimensional image transformed onto a plane normal to the direction its character cluster is facing); translated text image 312; and (v) anti-normalized translated text image 314 (two dimensional image transformed back onto an appropriate plane in a three dimensional image or else a projection of an appropriate plane in a two dimensional image representing a three dimensional scene).

The ability to determine the three dimensional orientation of objects in two dimensional images based upon vanishing point and perspective detection has been researched and implemented in known image processing systems. Methods of using such detection for reorienting text to facilitate character recognition. These character recognition methods take advantage of the three dimensional scene geometry to detect orientation of the plane upon which the characters are printed. As shown in FIG. 4 at reference numeral 310, the character recognition process transforms the video image of the text to a normalized co-ordinate system and then performs conventional character recognition techniques on this normalized portion derived from a portion of the video image. As shown at FIG. 4, reference numeral 314, the recognized characters are translated into another language.

Figure 4:
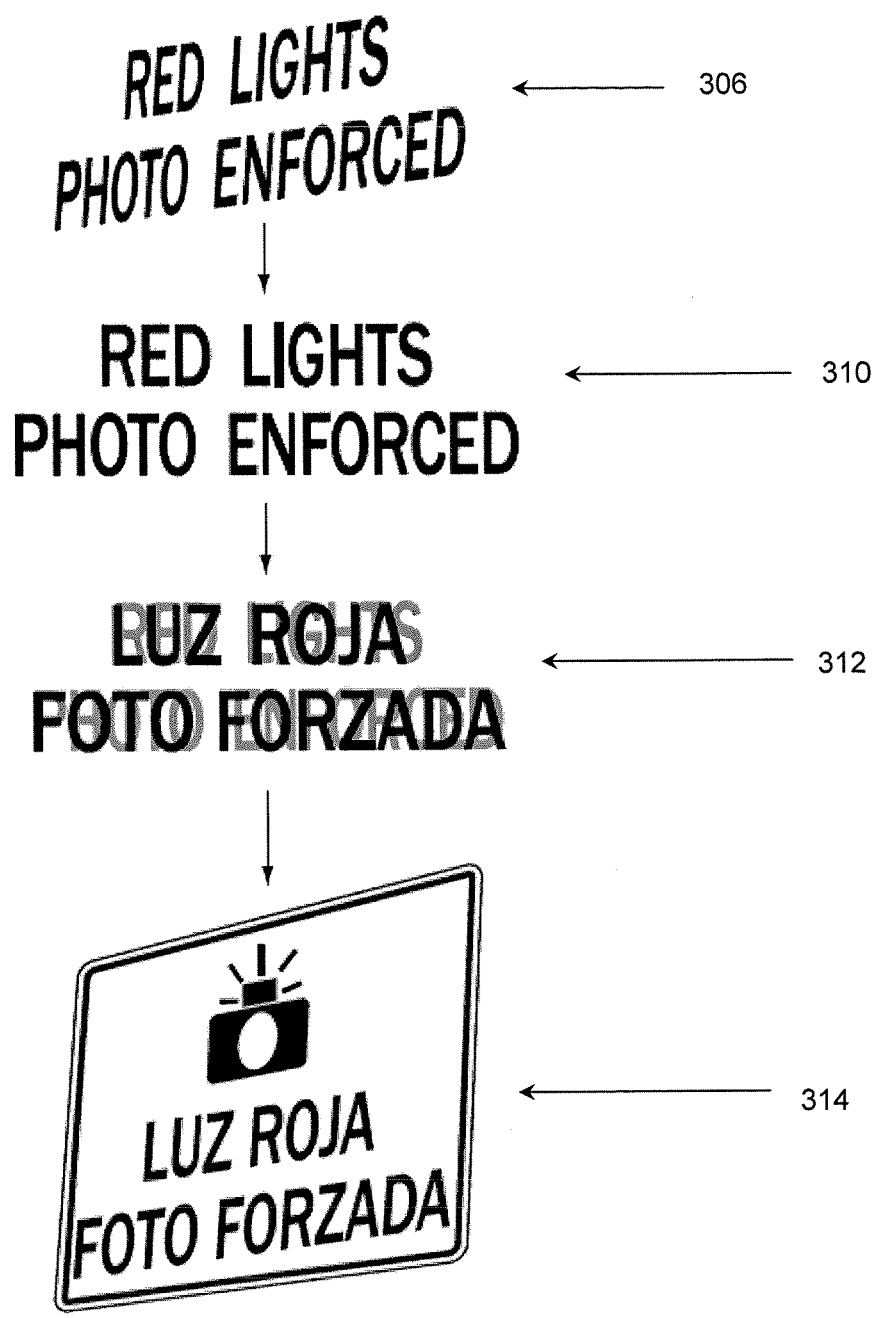
FIG. 4 is another diagram showing how text from real world images may be processed for use in the methods of the present invention.

According to the present invention, and as shown at FIG. 4, the transformation used to get from character cluster isolated image 306 to character recognition image 310 is inverted such that the translated text can be added to the raw image (or a similar image, like a subsequent video frame) and can appear in the image in a realistic way, as if the translated text was what really appeared on the sign. This inverted transformation is shown by the anti-normalized translated text image 314 in FIG. 4. The anti-normalized translated text image is a form of AR augmentation data used to make an AR visual presentation by being superimposed on a real world image. However, unlike many AR images, the AR augmentation data image is processed to change its appearance in a way that makes it appear in perspective of an object in the image. In two dimensional AR visual presentations, this will generally involve selectively shrinking and/or stretching various portions of the AR augmentation data image as shown by the change between image 312 and 314 in FIG. 4. For three dimensional AR visual presentations (such as AR goggles applications), other techniques may be used to anti-normalize the AR augmentation data image in order to make it appear in the appropriate three dimensional location and three dimensional orientation in three dimensional space. Regardless of the nature of the AR visual presentation, the point is that the AR augmentation data image is processed to make it appear as though the AR augmentation text actually appears on the same object in the AR visual presentation as the characters in the raw image from which the text was derived in the first place.

Figure 3:
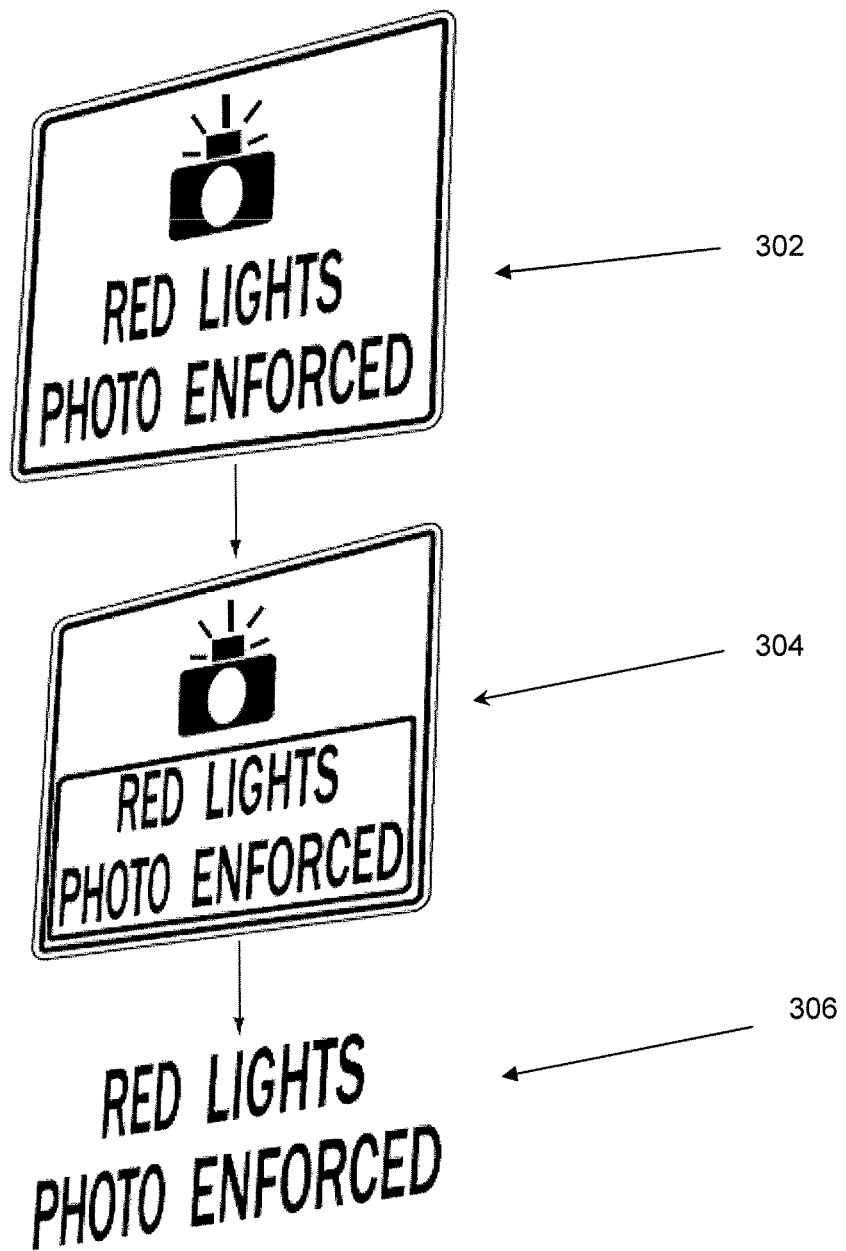
FIG. 3 is a diagram showing how text from real world images may be processed for use in the methods of the present invention.

The present invention also provides a solution for covering up the text over which the AR augmentation data is superimposed, as shown by comparing image 302 of FIG. 3 (text to be covered) to image 314 of FIG. 4 (translated text covers original text).

The method will now be described in more detail. First the orientation of the scene text is determined. For better understanding, image 304 of FIG. 3 visualizes the bounding box for the image text orientation. Next contrast ratios are used to mask and capture the text from the background scene. As shown by image 306 of FIG. 4, the character cluster of the roadside text has been isolated from the raw image. As shown by image 310 of FIG. 4, the isolated character cluster is normalized so that the plane of the text is the same as the projection plane of the image of the text. As shown by image 312, character recognition (as is currently conventional or by techniques to be developed in the future) and automatic translation (as is currently conventional or by techniques to be developed in the future) processing is performed on the isolated and normalized character cluster.

This method preferably uses a two dimensional bounding box, which is an outline placed closely around the text as shown in image 304 in FIG. 3. This bounding box can be used: (i) to isolate a cluster of characters to be transformed, recognized and translated; and (ii) to scale the translated text to fit the same two dimensional dimensions occupied by the original character cluster in the raw image. In embodiments where the AR data image (that is, the translated text) is to be put into a different image than the original raw image (for example, an image of a subsequent frame in a continuous video), then the bounding box of the AR data image would be matched to a comparable bounding box in the subsequent image in order to perform the anti-normalization of the present invention.

In some embodiments of the present invention, the AR data image may be anti-normalized and inserted into the AR visual presentation without regard for matching foreground and background colors and the like. In other words, the AR visual presentation may not need to look "realistic" so long as it is abundantly clear which surface in the real world image was the one bearing the text. The anti-normalization of the present invention is very useful for doing that, and doing that in a way that does not distract too much from the image as a whole. In these embodiments, it does not matter what color the text and its surrounding bounding box are made so long as the AR data image (for example, translated text and bounding box) are sufficiently opaque so that they cover the untranslated text to a sufficient degree so that the translated text can easily be read.

However, in some preferred embodiments of the present invention, efforts will be made to match the background and/or foreground colors of the translated text superimposed on the sign to form the complete AR visual presentation. In these embodiments, before superimposing the translated text, character cluster image 306 is first reversed to create an image with a photographic negative of the character cluster image. This can be done by using sample edge points to approximate reasonable fill colors for each character in the reversed character cluster image (they may or may not all have the same color and shade). In the example of image 306, this reversed character cluster image would appear as white text inside of a black bounding box, where the white color for the characters of the text would be determined by edge sampling. Then the characters in the reversed character cluster image (but not the black background) is superimposed over the characters in the raw image 302. Again, with reference to the examples of FIGS. 3 and 4, the white characters of the reversed image would be closely superimposed over, and thereby hide, the black characters in the raw image. After that, the characters (but not necessarily the background) of anti-normalized translated text image 314 would be superimposed over the image having its original, untranslated characters hidden. Again, in the example of FIGS. 3 and 4, this would mean that the black characters would be superimposed on a white background, as shown in the lower half of image 314. By taking care to preserve the original background color for the text, while wiping clean the original, untranslated characters, the translated sign AR visual presentation will have a natural look that is easier for humans to read and interpret as visual data.

Figure 5A:
FIG. 5A is a real world image typical of those used for image processing systems and methods according to the present invention.
Figure 5B:
FIG. 5B is an orthographic front view of a smart phone that is displaying a screen shot generated by image processing software according to the present invention.

Attention will now be turned to FIGS. 5A and 5B, which shows how translated sign text according to the present invention can be used in conjunction with method 100 of the present invention and method 200 of the present invention. FIG. 5A shows a sign in Spanish. It is a sign for a store that sells decorative stones, or, "pedras decorativas" in the original Spanish. After the sign is translated into the user's native language (English language in this example), and as shown in FIG. 5B, the user is given a choice of data processing applications to do further processing on the recognized text. For example, as shown at the third line in the black box in FIG. 5B, the user can choose to run a searching application to search the phrase "decorative stones." If the user proceed to choose this option, through the user interface on her smart phone, then this would be an example of the method 100 where the recognized text is used to choose a data application and then perform further processing based, at least in part, on the recognized text. As shown in the first and second lines in the black box of FIG. 5B, the telephone number has been recognized as a telephone number and the name "Stone Pedras decorativas" has been recognized as the name of an entity corresponding to the telephone number. Therefore, the user is presented with additional options to call the number or to add it to an address book as a contact. This is, again, an example of the method of FIG. 1 because further data processing choices are provided based on the recognized text.

More subtly, these first two choices in the black box of FIG. 5B also reflect an example of method 200 because the symbolic denotation of the telephone number, and the name above the telephone number, have been determined automatically and output data (that is, the first two options presented to the user) has been generated based upon this recognition of symbolic denotation of the recognized characters. In this way, various aspects of the present invention can work together to provide an especially inventive and useful system and method for the user. The user does not have to perform the user inputs that would otherwise be required to call up her telephone dialer application and/or her address book application and does not have to enter text into these applications corresponding to the telephone number and/or the business name. The symbolic denotation determination aspects of the present invention automatically determine that these choices are appropriate and, if these options are chosen, the text can be automatically handed over to the downstream application(s) in the correct "fields" because the symbolic denotation will allow an automatic determination of "what text goes where."

Figure 6:
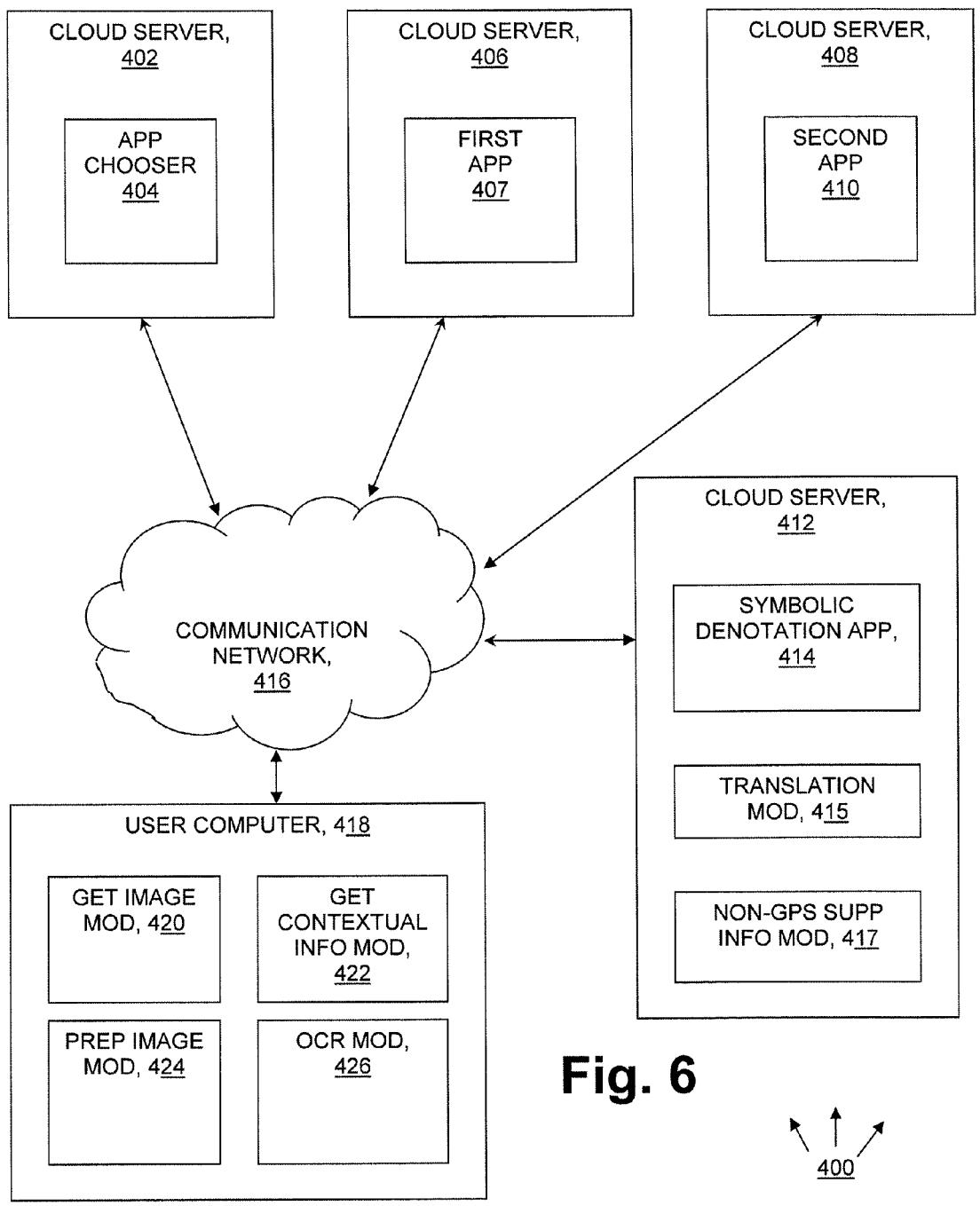
FIG. 6 is a schematic showing hardware and software according to the present invention.
Figure 7:
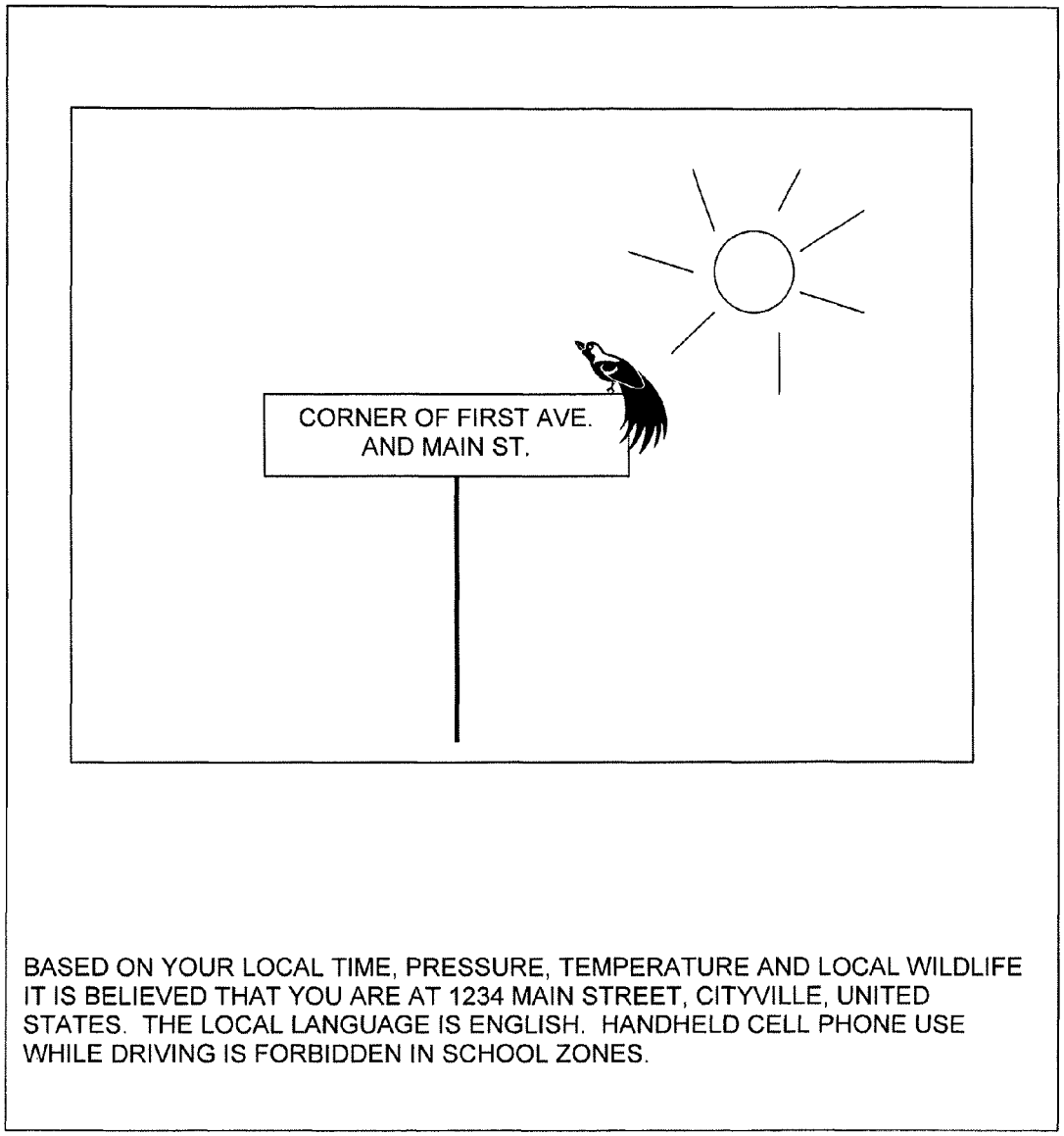
FIG. 7 is a screen shot showing a display generated by software according to the present invention.

FIGS. 6, 7, and 8 show an exemplary system 400 according to the present invention for: (i) allowing a user to choose a data processing application based on recognized text and using this recognized text as input to the chosen application (as in method 100); (ii) determine the symbolic denotation of the recognized text (as in method 200); and (iii) use "contextual information" to help make the determination of the symbolic denotation of the recognized text (which is yet another aspect of the present invention). As shown in FIG. 6, system 400 includes: cloud servers 402, 406, 408, 412; application chooser module 404; first data processing application module 407; second data processing application module 410; wide area communication network 416; symbolic denotation application module 414; translation module 415; non-GPS supplemental data module 417; user computer 418; get image module 420; get contextual information module 422; prepare image module 424; and optical character recognition (OCR) module 426. As shown in FIGS. 7 and 8, system 400 generates exemplary screen shots 428, 430.

While embodiment 400 shows a system of the present invention where the involved software is distributed over the user computer and several, separate cloud servers, other distributions of the modules (and their software) are possible. For example, all modules could be present on a single standalone user computer (such as a smart phone). As still another alternative distribution of modules, the modules could all be present on a single server that serves devices over a local area network. When designing a system, attention should be given to what and how much is required in as processing resources for each module so that each module can be present on a machine that has the required processing power to handle it. Also, the time delays occasioned by communicating data between modules over the network should be considered so that the system operates with sufficient speed as requisite data is communicated from one module to another. However the software portions of the various modules may be distributed over various types of machines, the software of the modules shall be considered to be stored on a "software storage device" (see DEFINITIONS section).

In order to practice the various inventive methods of the present invention, a user (not shown) of system 400 first gets a raw image (for example, a still image) using the get image module. An example of this was discussed above in connection with image 302 of FIG. 3.

The raw image is then prepared for character recognition by prep image module 424. An example of this was discussed above in connection with images 304, 306 and 310 of FIGS. 3 and 4.

The prepared image (see FIG. 4 at image 310) then has its characters recognized by OCR module 426. It is noted that the OCR process does not translate the text. OCR module 426 merely outputs a string of characters and/or associated formatting (for example, line breaks) based on the prepared image.

One preferred example of the use of "contextual information" will now be explained. Get contextual info module 422 gets the GPS co-ordinates from which the image was captured by user computer 418. This is part of the context for the string of characters that has been determined by OCR module 426. This particular type of contextual information is not present in the image itself, but, rather, is separate from the image, while still being related to the image. As will now be explained, this contextual information can be very useful in determining symbolic denotation(s) of the characters recognized by the OCR module. Specifically, in this example, the character string and the GPS co-ordinates are sent to translation module 414 over communication network 416. The translation module uses a database (not separately shown) to determine the local language of the place where the image was captured using the GPS co-ordinates as one form of contextual information. For example, if the image was captured in Brazil, then the local language would be determined by the translation module to be Portuguese. The translation module would then have effectively determined that the words of the character string are likely to be Portuguese words. By determining the language based on contextual information, the translation module can translate the character string into other language(s) without the user needing to enter the local language or to even be aware of what the local language is. The contextual information thereby allows for simplified translations requiring less time and mental effort by the user.

In the example of the previous paragraph, the translation, based on the contextual information of GPS co-ordinates is considered as a form of supplemental information to the recognized character string, recognized as a mere character string by the OCR module from the prepared image. Below, other possible types of contextual information and other possible types of supplemental information will be discussed. First, however, to finish up the example of the translated text, the translation module sends the translated text back to the user computer where it can be superimposed the raw image, as discussed above in connection with FIGS. 3 and 4, in order to generate and display an AR visual presentation including both the raw image and the translated text as AR data image.

The use of contextual information to generate useful supplemental information is not necessarily limited to determination of the local language for translation purposes. FIG. 7, shows another example including: (i) a raw image (having a street sign, the sun and a bird) with characters; and (ii) an output display of supplemental information ("Based on your local time, pressure, temperature and local wildlife it is believed that you are at 1234 Main Street, Cityville, United States. The local language is English. Handheld cell phone use while driving is forbidden in school zones."). In this example, no GPS co-ordinates are available, which is something that happens often in real world situations. This means that GPS co-ordinates cannot be used as contextual information in the example of FIG. 7. Still, the get contextual info module obtains the local time, the local pressure and local temperature from sensor devices (not shown) built into the user computer 418. These types of contextual info do not come from the image, even though they are related to it (as with the GPS co-ordinates in the previous example). Also, the get contextual information module uses image recognition software to recognize the species of bird in the image. This further type of contextual information actually comes from the image itself, specifically from a portion of the image other than the portion with the recognizable characters.

Get contextual info module 422 sends all of this contextual information described in the preceding paragraph to non-GPS supplemental data module 417 of cloud server 412. The non-GPS supplemental data module uses the local time of the image, the local temperature of the image, the local barometric pressure of the image and the species of bird captured in the image to determine the general, approximate location of the image without using GPS co-ordinates (which are not available in this example). The time can be used to determine the time zone, which helps pin down a range of longitudes. The pressure and temperature, when consulted against an up-to-date weather map can help determine possible latitude ranges within the time zone. The bird species can also help determine a latitude range, when consulted against a data base of where various bird species can be spotted. In this example, the location of the image (regardless of how precisely it can be determined) is not contextual information that is provided by the user computer because of the unavailability of the GPS. Instead, the determination of approximate location is a form of supplemental data determined based upon contextual information in the form of time, temperature, pressure and bird species. This example gives some idea that the concept of using contextual information is not necessarily limited to the preferred example of using contextual information, in the form of GPS co-ordinates, to determine supplemental information, in the form of identification of the local language where the image was captured.

In the example of FIG. 7, the approximate local location is not the only supplemental information that has been determined. As indicated by the text at the bottom of the screen shot of FIG. 7, it has been determined that the local language is English. In this example, it will be assumed that the user is an English language speaker and no translation is desired. However, this determination of supplemental information of the identity of the local language can lead to contextual information being used in conjunction with a determination of semantic denotation of text recognized in the image in order to determine even more supplemental information. This use of both symbolic denotation and contextual information is a powerful and useful aspect of some embodiments of the present invention.

More specifically, In FIG. 7, the street sign is recognized as a street sign by symbolic denotation application module 414, using method 200 discussed above. It is known that the local language for this street sign is English because that supplemental info has been determined. Therefore, non-GPS supplemental info module can further determine that the image was captured at or near the intersection of First Avenue and Main Street (opposed to being taken in the vicinity of a clothing store called "Corner of First Ave. and Main St."). Instead of recognizing the street sign by its color and layout (as explained above in connection with FIG. 2), symbolic denotation application module 414 might have the user explain that this is a street sign in the image. As a further alternative, symbolic denotation application module 414 might automatically recognize the sign as a street sign because it uses the words "corner," "Ave.," and "St.," which, taken in conjunction, are highly indicative of a sign inducting a location. The absence of arrows on the sign might also be used to help automatically determine that the image was captured at the corner of First Avenue and Main Street. Conversely, if the text of the image included an arrow and a distance in the vicinity of the location, then symbolic denotation application might automatically determine that the image was capture by a sign located some distance from the corner of First Avenue and Main Street in a direction directly opposite to the direction in which the arrow points.

At this point in the co-operative processing of symbolic denotation application module 414 and non-GPS supplemental info module 417, an approximate location of the user is known and it is further known that she is in the vicinity of streets that have the names "Main Street" and "First Avenue." However, "Main Street" and "First Avenue" are common street names, so this information, by itself, does not automatically allow determination of a precise location of the user. However, because an approximate location has been determined using the contextual information of time, temperature, pressure and bird species, it may be possible to determine exactly which town or city the user is in by checking a street map database to see how many cities and towns within the area of the user's approximate location have an intersection of a First Avenue and a Main Street. This is part of the reason that it can be useful to collect as much contextual information, of various types, to determine the user's approximate location as precisely as feasible. Once this contextual information is combined with the additional information of the symbolic denotation of the text, it may be possible to make a much more precise and reliable location of the user than would be possible when contextual info is more scarce and the approximate location, based only upon the contextual info, is less precise and/or accurate. As shown at the bottom of FIG. 7, in this example, the non-GPS supplemental info mod has managed to pinpoint the user's location at the corner of Main Street and First Avenue in a town called "Cityville" in the United States, and it has made this pinpoint determination without: (i) the user being required to enter data about her location (which she may not know anyway); and (ii) resort to GPS (which may not be available).

Once the user's location is pin-pointed based on symbolic denotation of recognized text used in conjunction with contextual information, the determination of still more supplemental information may be made by non-GPS supplemental info mod 417. For example, as shown at the bottom of FIG. 7, a consultation of the database of local laws has shown that local law forbids the use of hand-held cell phones in school zones in the city and/or state where the user is located. Because the law on this subject can vary, it is helpful to relate this information to the user as she might be driving a vehicle and will want to take precautions to avoid violating the local law. Of course, the variety of possible types of supplemental information is very wide, as is the variety of possible types of contextual info that may be used in determining the various kinds of supplemental info.

Figure 9:
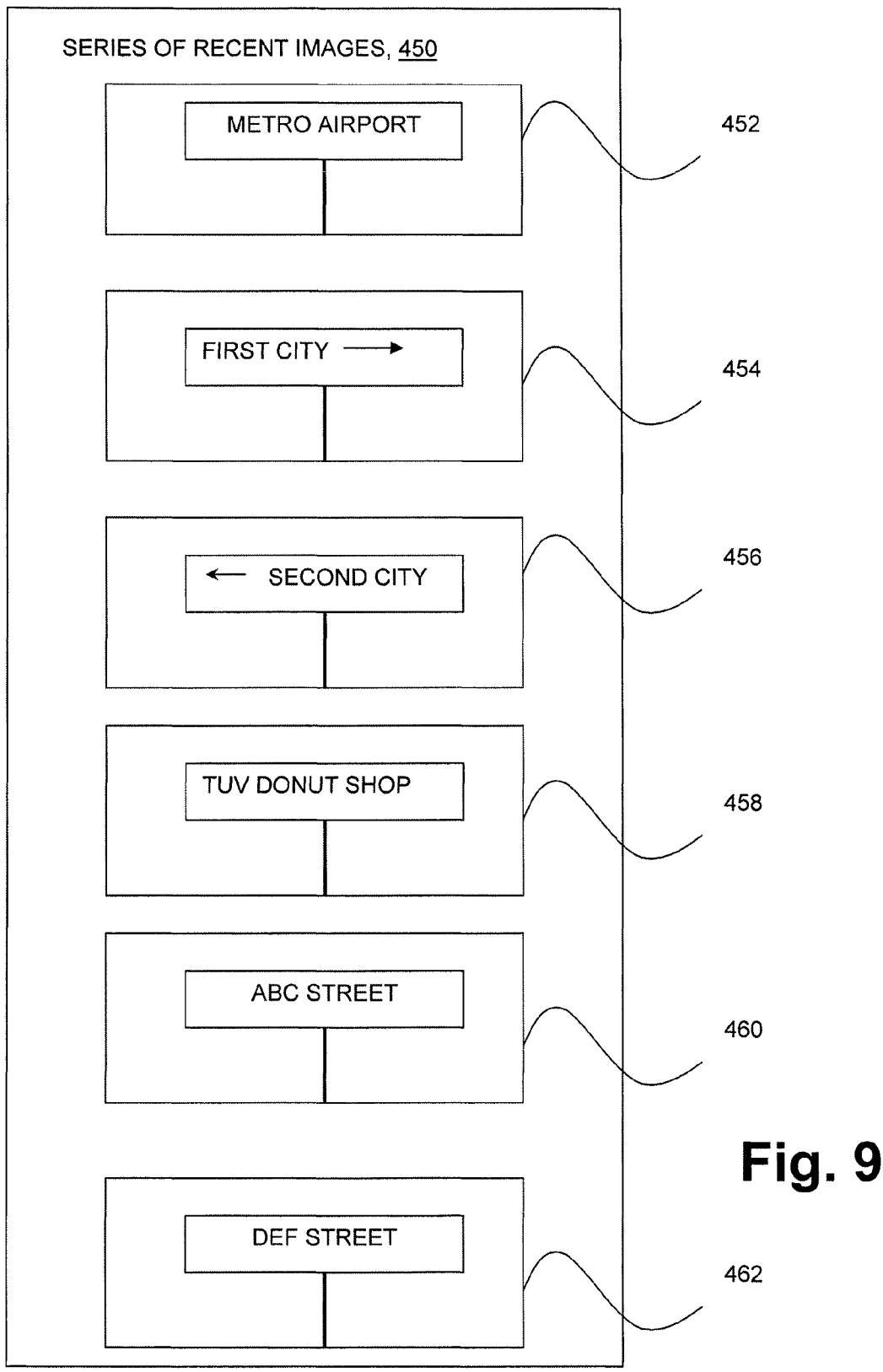
FIG. 9 is a series of images for use with systems and methods according to the present invention.

Another preferred example of a special type of contextual information will now be explained in connection with FIG. 9. This preferred type of contextual information is called previous image data. As shown in FIG. 9, series of recent images 450 includes: Metro Airport sign image 452; First City and Right Arrow image 454; Second City and left arrow image 456; TUV Donut Shop sign image 458; ABC Street sign image 460; and DEF Street sign image 462. the DEF street sign image is the current image which was just captured and is now undergoing analysis and processing by system 400. Images 452, 454, 456, 458, 460 are recent history images taken with in a previous predetermined time interval (determined by the user or automatically). The previous images represent context information about where the user has been recently. No single image of series 450 can precisely pinpoint the user's location in and of itself. However, the recognized text (and/or the determination of symbolic denotations if these recognized texts) are taken into consideration in combination, the system may be able to pinpoint, or at least narrow down, where in the world the user might be through the use of recent historical image context info taken in conjunction with the recognized text of the current image. In the example of FIG. 9, the system has determined that the user is on a street called "DEF" in the vicinity of a street called "ABC" and a donut shop called "TUV," somewhere generally between First City and Second City, and in the general vicinity of an airport called "Metro." While there may be many streets called ABC, many streets called DEF, many airports called "Metro," and many shops called "TUV Donut," when this information is considered together, and further considered in conjunction with the relative timing at which each image was captured, it becomes much more likely that the user's location can be reliably determined as supplemental information based, in large part, on the historical context info.

FIG. 8 is a screen shot that demonstrates how determination of symbolic denotation, and determination of supplemental info based on context info, can help provide a better choice of data processing applications for practicing method 100, where a data processing application is chosen and run using input based on the image. In the previous examples of method 100 discussed above, it was the recognized characters of the text itself that were provided as (at least part of) the user input to a chosen further data processing program. However, in the example of FIG. 8, the supplemental info is used to automatically run data processing programs and/or as user input in data processing programs that the user chooses to run. More specifically, it is the fact that the user is in the city of Cityville that largely determines how further data processing based on the image is performed. However, the word "Cityville" does not appear in any of the images directly. Rather, this important descriptor word is determined by using the recognized text in the current image taken in conjunction with contextual information (historical and/or current image related). The choice of applications, generated by application chooser module 404 (see FIG. 6) and presented to the user in the screen shot of FIG. 8, will now be discussed in the following paragraphs.

The first data processing option is to post the current location to the website, which application would be performed first data processing application module 407, should the user make that choice. The user can make that choice with a single point and click user input operation here, precisely because the user's location has been determined automatically and can be automatically passed to first app 407.

The second data processing option is to add various nearby businesses to the user's contact list, which is stored online by second app 410 of server 408. Once again, this process is streamlined because of the determination of symbolic denotation of characters recognized in the image, and further because of the use of contextual info in conjunction with the symbolic denotation. Similarly, options 3 to 5 help give some idea the great variety of further data processing options that might use, according to various embodiments of the present invention, that might use the characters recognized from the user's image(s).

DEFINITIONS

Any and all published documents mentioned herein shall be considered to be incorporated by reference, in their respective entireties. The following definitions are provided for claim construction purposes:

Present invention: means "at least some embodiments of the present invention," and the use of the term "present invention" in connection with some feature described herein shall not mean that all claimed embodiments (see DEFINITIONS section) include the referenced feature(s).

Embodiment: a machine, manufacture, system, method, process and/or composition that may (not must) be within the scope of a present or future patent claim of this patent document; often, an "embodiment" will be within the scope of at least some of the originally filed claims and will also end up being within the scope of at least some of the claims as issued (after the claims have been developed through the process of patent prosecution), but this is not necessarily always the case; for example, an "embodiment" might be covered by neither the originally filed claims, nor the claims as issued, despite the description of the "embodiment" as an "embodiment."

First, second, third, etc. ("ordinals"): Unless otherwise noted, ordinals only serve to distinguish or identify (e.g., various members of a group); the mere use of ordinals shall not be taken to necessarily imply order (for example, time order, space order).

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Software storage device: any device (or set of devices) capable of storing computer code in a non-transient manner in one or more tangible storage medium(s); "software storage device" does not include any device that stores computer code only as a signal.

computer system: a computer (of any type now known of to be developed in the future) and/or a set of computers in data communication where the computer or computers include a software storage device (see DEFINITIONS section).

symbolic denotation: involves determining at least part of the commonly-human-understandable meaning of a character string; includes, but is not limited to, a determination of the language in which a character string is written.

Context information: is limited to context information automatically determined and supplied by a computer system and not by a human user; for example, if a human user specifies that the language in her vicinity is "Portuguese" then this is not context info because a human user was required to provide the info.

Unless otherwise explicitly provided in the claim language, steps in method or process claims need only be performed that they happen to be set forth in the claim only to the extent that impossibility or extreme feasibility problems dictate that the recited step order be used. This broad interpretation with respect to step order is to be used regardless of alternative time ordering (that is, time ordering of the claimed steps that is different than the order of recitation in the claim) is particularly mentioned or discussed in this document. Any step order discussed in the above specification, and/or based upon order of step recitation in a claim, shall be considered as required by a method claim only if: (i) the step order is explicitly set forth in the words of the method claim itself; and/or (ii) it would be substantially impossible to perform the method in a different order. Unless otherwise specified in the method claims themselves, steps may be performed simultaneously or in any sort of temporally overlapping manner. Also, when any sort of time ordering is explicitly set forth in a method claim, the time ordering claim language shall not be taken as an implicit limitation on whether claimed steps are immediately consecutive in time, or as an implicit limitation against intervening steps.

What is claimed is:

1. A method for analyzing an image obtained at a location, the method comprising the steps of:
   receiving, by a computer system, an image comprising text, and contextual information data associated with the image, wherein the contextual information comprises a plurality of images of the vicinity of the image comprising text, the plurality of images obtained within a predetermined time interval prior to obtaining the image comprising text;
   performing character recognition using said image to yield a character string;
   sending, to a non-GPS supplemental data module, the received contextual information data;
   determining, by the non-GPS supplemental data module, an approximate location of the image based on the received contextual information data; and
   providing an analysis of the image based at least in part on the contextual information data and the approximate location of the image, wherein the analysis comprises at least a portion of the character string.

2. The method of claim 1 further comprising the steps of:
performing image preparation, by the computer system, of the image for character recognition;
wherein the performing-image-preparation step includes the sub-step of normalizing the portion of the image including the characters so that the characters appear as if a plane upon which they are printed is substantially normal to a direction from which the image was captured; and
wherein at the performing-character-recognition step, the character recognition is performed on the image as prepared at the performing-image-preparation step.

3. A computer system comprising:
a first data processing program module;
an image receiving module structured and/or programmed to receive an image obtained at a location, and contextual information data associated with the image, wherein the contextual information comprises a plurality of images of the vicinity of the image comprising text, the plurality of images obtained within a predetermined time interval prior to obtaining the image comprising text;
a character recognition module structured and/or programmed to perform character recognition on at least a portion of the image to yield a character string;
a non-GPS supplemental data module, structured and/or programmed to receive the contextual information data, and further structured and/or programmed to determine an approximate location of the image based on the received contextual information data; and
an analysis module structured and/or programmed to analyze the image based at least in part on the contextual information data and the approximate location of the image, wherein the analysis comprises at least a portion of the character string.

4. The system of claim 3 further comprising an image preparation module structured and/or programmed to perform image preparation for character recognition on the image, with the image preparation including at least normalizing the portion of the image including the characters so that the characters appear as if a plane upon which they are printed is substantially normal to a direction from which the image was captured.

5. Software stored on a software storage device for use by a computer system, the software comprising:
a first data processing program;
an image receiving software portion programmed to receive an image obtained at a location, and contextual information data associated with the image, wherein the contextual information comprises a plurality of images of the vicinity of the image comprising text, the plurality of images obtained within a predetermined time interval prior to obtaining the image comprising text;
a character recognition software portion programmed to perform character recognition on at least a portion of the image to yield a character string;
a non-GPS supplemental data receiving software portion programmed to receive the contextual information data, and further programmed to determine an approximate location of the image based on the received contextual information data; and
an analysis software portion programmed to provide an analysis of the image based at least in part on the contextual information data and the approximate location of the image, wherein the analysis comprises at least a portion of the character string.

6. A method comprising the steps of:
receiving, by a computer system, an image obtained at a location, and associated contextual information data, wherein the contextual information comprises a plurality of images of the vicinity of the image comprising text, the plurality of images obtained within a predetermined time interval prior to obtaining the image comprising text;
performing character recognition, by the computer system, on at least a portion of the image to yield a character string as text data;
determining symbolic denotation data, by the computer system, indicating symbolic denotation of at least a portion of the character string based upon the text data and the contextual information data;
sending, to a non-GPS supplemental data module, the received contextual information data;
receiving, from the non-GPS supplemental data module, an approximate location of the image based on the received contextual information data; and
performing further processing, by the computer system, on the recognized character string based, at least in part, upon the symbolic denotation data and the approximate location of the image.

7. The method of claim 6 further comprising the step of:
choosing a first further data processing program which is stored on a software storage device;
wherein at the determining step, an addressing portion of the recognized character string is determined to have a symbolic denotation in that it corresponds to one of the following address categories: a telephone number, a physical street address or an email address; and
wherein at the performing-further-processing step, the addressing portion of the recognized character string is input to a further data processing program along with its address category.

8. The method of claim 7 wherein:
at the determining step, an addressable-entity portion of the recognized character string is determined to have a symbolic denotation in that it corresponds to entity having an address indicated by the addressing portion; and
at the performing-further-processing step the addressable-entity portion of the recognized character string is input to the further data processing program as the entity corresponding to the address of the addressing portion.

9. The method of claim 6 wherein the contextual information data is previous image data.

10. A computer system comprising:
a receiving module structured and/or programmed to receive: (i) an image obtained at a location; and (ii) associated contextual information data, wherein the contextual information comprises a plurality of images of the vicinity of the image comprising text, the plurality of images obtained within a predetermined time interval prior to obtaining the image comprising text;
a character recognition module structured and/or programmed to perform character recognition on at least a portion of the image to yield a character string as text data;
a non-GPS supplemental data module structured and/or programmed to receive the associated contextual information data, and further structured and/or programmed to determine, based on the contextual information data, an approximate location of the image; and a symbolic denotation module structured and/or programmed to: (i) determine symbolic denotation data indicating symbolic denotation of at least a portion of the recognized character string based upon the text data of the character string and the contextual information data, and (ii) perform further processing on the recognized character string based, at least in part, upon the symbolic denotation data and the approximate location of the image.

11. The system of claim 10 further comprising a GPS module structured and/or programmed to determine GPS location data.

12. The system of claim 11 further comprises a translation module structured and/or programmed to:
   determine the language of the recognized character string based on contextual information data in the form of the GPS location data, and determine language-specific symbolic denotation data in the form of a translation for the recognized character string based on the language determined at the determining-the-language sub-step.

* * * * *